Oct. 29, 1968    L. O. MYERS, JR    3,407,440
APPARATUS FOR PRODUCING CORRUGATED STRUCTURES
Filed Sept. 30, 1966
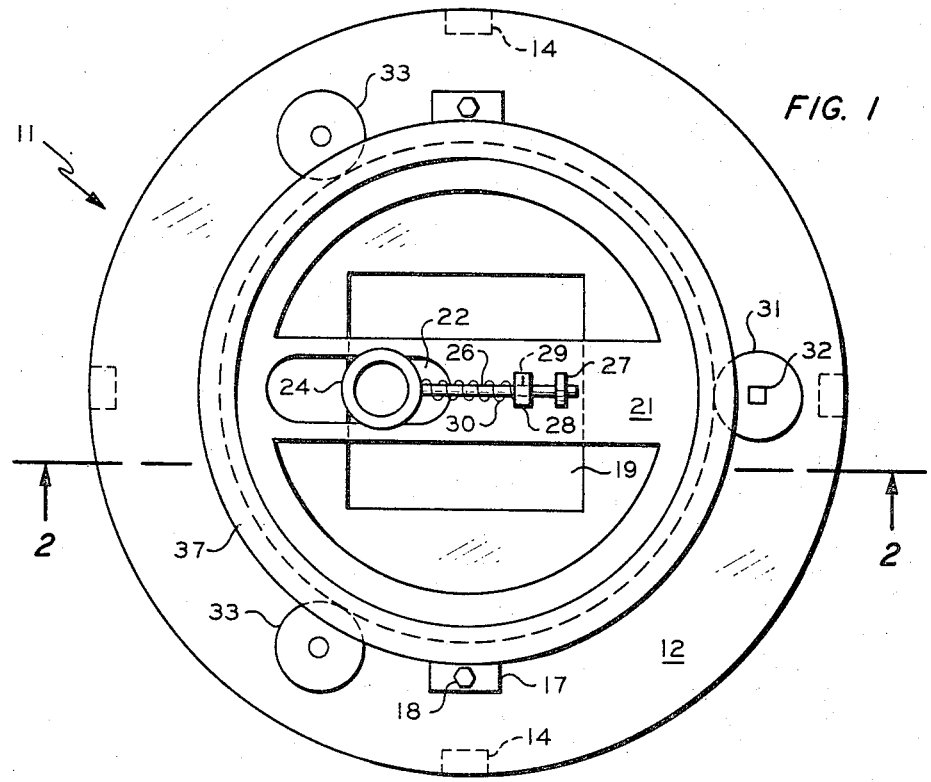
FIG. 1
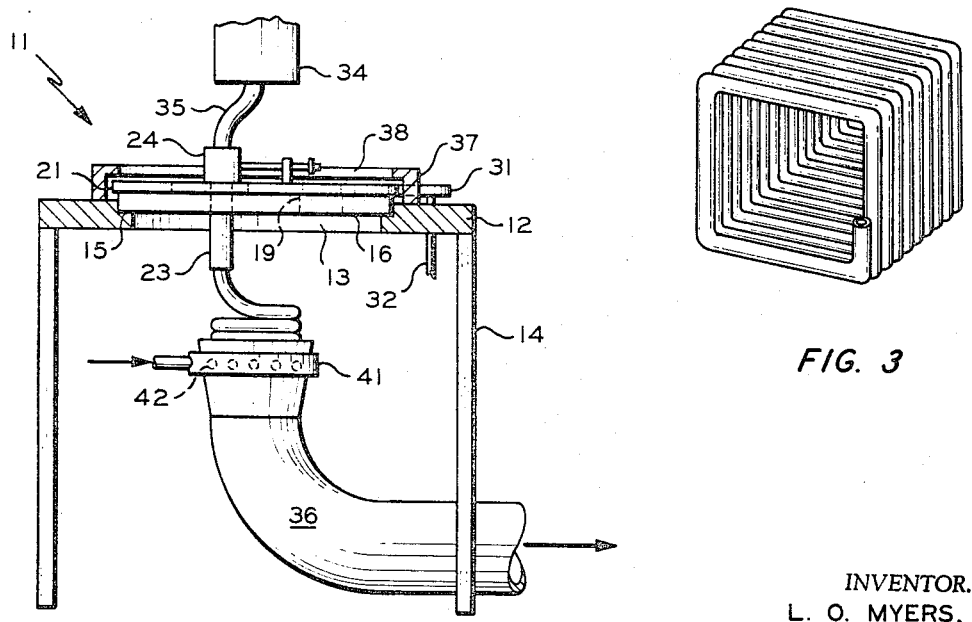
FIG. 2
FIG. 3
INVENTOR.
L. O. MYERS, JR.
BY
ATTORNEYS United States Patent Office 3,407,440
Patented Oct. 29, 1968

3,407,440
APPARATUS FOR PRODUCING
CORRUGATED STRUCTURES
Luther O. Myers, Jr., Bartlesville, Okla., assignor to Phillips Petroleum Company, a corporation of Delaware
Filed Sept. 30, 1966, Ser. No. 583,173
4 Claims. (Cl. 18—12)

ABSTRACT OF THE DISCLOSURE

Apparatus for producing corrugated structures of plastic conduit which operates cooperatively with means for downwardly extruding the extrudate in rod or tubular form which consists of superimposed plates, one of which is rotatable and carries a slidably positionable shoulder into which the extrudate is deposited, the shoulder tracing the periphery of an opening in the lower plate upon rotation of the upper plate to deposit extrudate in the configuration defined by the opening in the lower plate.

---

This invention relates to plastic structures. In one aspect it relates to apparatus for producing plastic structures. In another aspect it relates to a plastic structure having a wall produced from tubing extruded from a die while still in a deformable state. In this application the term "corrugated structures" is used to mean a structure formed having a wall formed with alternate ridges and grooves.

An object of the invention is to provide apparatus for producing corrugated structures.

Another object of the invention is to produce flexible, self-insulating corrugated structures having high burst and compression strength.

Other aspects, objects and advantages of the invention will be apparent to one skilled in the art from a study of the written description, the drawing and the claims.

According to the invention, apparatus is provided to produce a plastic structure formed by extruding a plastic tubing guiding the extrudate while descending generally vertically to form from the extrudate a desired shape of plastic structure having hollow walls formed of the extrudate. The extrudate can be any suitable cross-sectional shape. When a generally circular cross-sectional extrudate is used, the resulting conduit is corrugated, that is, its side walls have alternate ridges and grooves.

The extrudate is guided in such a manner that it is deposited in the shape of the cross-section of the desired plastic conduit. The heating, cooling, and handling of the extrudate are such that, as each portion of the extrudate is deposited on the top of the next lower portion, it has sufficient rigidity to prevent collapse under its own weight but is sufficiently flexible to permit the formation into the desired cross-section of the formed conduit and to be heat sealed to the next lower portion. Thus, the continuous extrudate can be deposited in a generally square-shaped manner with the walls sealed together to form a continuous conduit.

According to the invention, conduits of any desired cross-sectional shape can be formed. A conduit thus formed has high bursting and compressive strength and has an insulated wall structure. The conduit can have the same cross-sectional shape throughout its longitudinal dimension or the shape can be modified by modifying the shape in which the extrudate is guided during the conduit formation. The invention finds particular utility in the formation of a flexible corrugated conduit by guiding a generally circular cross-sectional extrudate into a generally square-shaped cross-sectional conduit.

Further, according to the invention, there is provided apparatus for producing a square-shaped corrugated conduit.

In the drawing FIGURE 1 is a plan view of apparatus for making square-shaped corrugated conduits according to the invention.

FIGURE 2 illustrates a partial cross-section along line 2—2 of FIGURE 1.

FIGURE 3 is an axonometric view of a square-shaped corrugated conduit produced accordingly by the apparatus of the invention.

Referring now to the drawing where like elements are designated by like numerals, and particularly to FIGURES 1 and 2, an apparatus for producing plastic conduits, generally indicated by reference numeral 11, is shown. Apparatus 11 comprises a first plate 12 having an opening 13 therein, and a plurality of legs 14 connected to first plate 12 to maintain first plate 12 in a horizontal position. First plate 12 is provided with a shoulder 15 into which a second plate 16 is positioned. Second plate 16 is provided with flanges 17 which are bolted to first plate 12 by bolts 18 thereby causing second plate 16 to remain stationary with respect to first plate 12. A square-shaped opening 19 is provided within second plate 16. A third plate 21 is positioned above second plate 16. The lower surface of third plate 21 and the upper surface of second plate 16 are finished to allow friction-free or ball bearing supported rotation of rotating third plate 21 with respect to second plate 16. A slot 22 is provided in third plate 21 into which is positioned a conduit 23. Conduit 23 is provided with a shoulder 24 which contacts third plate 21. The lower section of conduit 23 extends through openings 13, 19 and slot 22. The outer edge of conduit 23 contacts the surface of square-shaped opening 19. A shaft 26 is connected to shoulder 24 at one end and is provided with a head 27 at the other end. A support block 28, connected to and carried by third plate 21, is provided with a bore 29 through which shaft 26 is passed. A spring 30 is positioned around shaft 26 and abuts shoulder 24 at one end and support block 28 at the other end. As conduit 23 is moved around the periphery of square opening 19 shaft 26 reciprocates through bore 29 of support block 28 while spring 30 maintains conduit 23 adjacent the periphery of square opening 19.

A drive gear 31 is operatively connected to a shaft 32 which is carried by first plate 12 and operatively connected to a motor (not shown). Drive gear 31 is operatively connected to third plate 21 as shown, thus causing third plate 21 to rotate in response to drive gear 31. Idlers 33 are positioned on first plate 12 to maintain third plate 21 in position when third plate 21 is being rotated by drive gear 31. Third plate 21 can be provided with gear teeth on its outer periphery which mesh with gear 31 or a friction drive relationship between gear 31 and third plate 21 can be used.

A fourth plate member 37 having an opening 38 therein is connected to and carried by first plate member 12. Plate 37 serves as an upper support plate which, in cooperation with plate 12, maintains plates 16 and 21 in position while plate 21 rotates in response to gear 31.

An extruder 34 delivers extrudate 35 to conduit 23. As conduit 23 rotates in response to the movement of third plate 21 which is moving in response to drive gear 31, extrudate 35 passing through conduit 23 is caused to be deposited upon itself thus forming a desired-shaped plastic conduit whose outside surface has an outline similar to the periphery of square-shaped opening 19. As the sides of the extrudate are overlapped, the sides are sealed together and the finished product is conveyed by a receiving tube 36 to a reel (not shown) where it is stored. The finished product is removed at a rate such that the overlapping of the extrudate occurs approximately the same distance below the apparatus thus forming a uniform product. Conduit 23 can be provided with a heating element (not shown) which furnishes heat to the exterior surface of the extrudate thereby maintaining the exterior surface of the extrudate soft enough to self-seal while the interior walls of the extrudate are cooled to prevent collapse of the extrudate.

A cooling conduit 41 having a plurality of apertures 42 therein is attached to receiving tube 36. As the finished product is passed into receiving tube 36 a cooling fluid, such as air or water, is injected upon the outer surface of the product and cools the product to prevent any sagging or deformation of the product due to retained heat. When a liquid, such as water, is employed as the coolant the liquid serves the additional purpose of lubricating the product thereby facilitating the travel through receiving conduit 36.

In FIGURE 3 there is shown a square-shaped plastic conduit having self-sealed sides made from generally circular-shaped plastic tubing by the apparatus of the present invention.

EXAMPLE

A blend comprising about 2½ percent by weight of polyvinylacetate and 97½ percent by weight of polyethylene is extruded having a melt index of 0.5 at a temperature of about 400° F. into the shape of tubing about ⅝-inch in diameter and a wall thickness of approximately 60 mils. Upon extruding and while the tubing is still in a deformable state, i.e. the tubing temperature being about 400° F., the tubing is directed downwardly through a guiding conduit which acts as a cam follower moving in response to the rotation of the third plate to which the extruded tubing is carried and the conduit follows the inner periphery of the square opening in the second plate. The square opening in the second plate has a diameter of about 5 inches. As the conduit is rotated around the inner periphery of the square opening, a square-shaped plastic conduit having an O.D. of about 5 inches is formed. The square-shaped plastic conduit is slowly lowered into a receiving chamber where it is sprayed with water at about 80° F. before being transmitted onto a reel where it is placed.

Although the present invention has been employed to describe the formation and characteristics of a square-shaped corrugated conduit, reasonable variations and modifications are possible within the scope of the invention and various geometrically-shaped conduits can be made of any desirable plastic, such as polyethylene, polypropylene, copolymers of 1-olefins, and blends of polymers such as polyvinylacetate and 1-olefin polymers. Various shapes, e.g. triangular, rectangular, trapezoidal, and the like, can be formed by replacing plate 16 with a plate having a suitably shaped opening.

That which is claimed is:

1. An apparatus for producing plastic conduits from an extrudate in combination with means for downwardly extruding said material in rod or tubular form comprising:
    (a) a horizontally supported first plate member having an opening therein disposed below said extruding means;
    (b) a second plate member having an opening therein, said second plate member being detachably connected to and positioned above said first plate member and the opening in said second plate member being smaller and overlying the opening in said first plate member;
    (c) a third rotatable plate member having an elongated slot therein, said third plate member being positioned above said second plate member;
    (d) a guiding means for the extruded molten thermoplastic material carried in said slot of said third rotatable plate member, said guiding means extending through the openings in said first and second plate members;
    (e) a driving means operatively connected to said third rotatable plate member for causing said third rotatable plate member to rotate; and
    (f) biasing means positioned between said guiding means and said third plate member causing said guiding means to follow the opening in said second plate member.

2. Apparatus according to claim 1 wherein said second plate member has a square-shaped opening therein.

3. Apparatus according to claim 1 wherein said guiding means comprises a conduit having an upper shoulder and a lower extending portion, and said biasing means comprising a shaft connected to said upper shoulder at one end and having a head element at its other end, a support block having a bore therein connected to said third rotating plate member through which said shaft reciprocates back and forth through the bore of said support block, and a spring positioned around said shaft between said upper shoulder and said support block to provide spring tension on said conduit.

4. Apparatus according to claim 1 further including a receiving means positioned downstream of said guiding means, said receiving means comprising a tube through which a formed pipe is passed and a cooling conduit having a plurality of apertures therein carried by said tube thus allowing cooling fluids to be passed through said apertures to cool formed pipe.

References Cited

UNITED STATES PATENTS

| | | |
|---|---|---|
| 2,671,939 | 3/1954 | Everhart et al. |
| 2,654,124 | 10/1953 | Layte. |
| 2,728,104 | 12/1955 | Fisch. |
| 3,207,827 | 9/1965 | Kuehnle. |
| 3,290,727 | 12/1966 | Petzetakis. |

WILLIAM J. STEPHENSON, *Primary Examiner.*